US012658213B2

(12) United States Patent
Huang et al.

(10) Patent No.: US 12,658,213 B2
(45) Date of Patent: Jun. 16, 2026

(54) VIDEO MATERIAL EDITING METHOD AND APPARATUS

(71) Applicant: Beijing Zitiao Network Technology Co., Ltd., Beijing (CN)

(72) Inventors: Xuehang Huang, Beijing (CN); Guangde Huang, Beijing (CN); Shuchao Lin, Beijing (CN); Yongcai Yan, Beijing (CN); Senyu Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/389,621

(22) Filed: Dec. 19, 2023

(65) Prior Publication Data

US 2024/0119971 A1     Apr. 11, 2024

Related U.S. Application Data

(63) Continuation of application No. PCT/CN2023/121138, filed on Sep. 25, 2023.

(30) Foreign Application Priority Data

Sep. 30, 2022     (CN) .......................... 202211231854.1

(51) Int. Cl.
   G11B 27/036        (2006.01)
   G06F 3/0481        (2022.01)
   (Continued)

(52) U.S. Cl.
   CPC .......... G11B 27/036 (2013.01); G06F 3/0481 (2013.01); G11B 27/34 (2013.01); *G06F 2203/04803* (2013.01)

(58) Field of Classification Search
None
See application file for complete search history.

(56) References Cited

U.S. PATENT DOCUMENTS 5,836,770 A * 11/1998 Powers .................. A63B 69/00
                                                434/257
7,987,481 B2 * 7/2011 Fukuda .............. H04N 21/4316
                                                725/38
(Continued)

FOREIGN PATENT DOCUMENTS

CN        103916607 A     7/2014
CN        105307028 A     2/2016
(Continued)

OTHER PUBLICATIONS

Japan Patent Application No. 2023-579311; Rejection Reason Notification; dated Jan. 21, 2025; 10 pages.
(Continued)

*Primary Examiner* — Hung Q Dang
(74) *Attorney, Agent, or Firm* — BakerHostetler

(57)     ABSTRACT

A video material editing method and apparatus are provided. The method includes: acquiring a plurality of video materials; and determining a video split-screen template. By exhibiting a plurality of video track clips formed based on the plurality of video materials on a video editing track, and displaying a video editing image formed from video images of the plurality of video track clips according to a video split-screen template, video images of the plurality of video track clips are exhibited through a plurality of split regions in the video editing image in a split-screen manner; timeline intervals corresponding to the plurality of video track clips on the video editing track at least partially overlap with each other, to render that the finally obtained video has a video split-screen splice effect.

14 Claims, 8 Drawing Sheets

(51) Int. Cl.

| | |
|---|---|
| *G06F 3/0482* | (2013.01) |
| *G06F 3/04845* | (2022.01) |
| *G06F 3/0486* | (2013.01) |
| *G06F 3/04883* | (2022.01) |
| *G06F 3/04886* | (2022.01) |
| *G11B 27/031* | (2006.01) |
| *G11B 27/034* | (2006.01) |
| *G11B 27/34* | (2006.01) |
| *H04N 5/262* | (2006.01) |
| *H04N 5/265* | (2006.01) |
| *H04N 21/44* | (2011.01) |
| *H04N 21/845* | (2011.01) |

(56) References Cited

U.S. PATENT DOCUMENTS

| | | | | |
|---|---|---|---|---|
| 8,774,604 | B2 | 7/2014 | Torii et al. | |
| 2002/0008780 | A1* | 1/2002 | Han | H04N 7/01 |
| | | | | 348/E7.003 |
| 2008/0278628 | A1* | 11/2008 | Hirata | H04N 21/4438 |
| | | | | 348/E5.105 |
| 2011/0305438 | A1* | 12/2011 | Torii | H04N 21/2743 |
| | | | | 386/E5.003 |
| 2018/0247672 | A1* | 8/2018 | Doyle | H04N 21/2365 |
| 2020/0186887 | A1* | 6/2020 | Kwon | G11B 27/34 |
| 2021/0005223 | A1* | 1/2021 | Wang | G06F 3/0482 |
| 2022/0417621 | A1 | 12/2022 | Saito | |

| | | | | |
|---|---|---|---|---|
| 2023/0095856 | A1* | 3/2023 | Frey | G11B 27/28 |
| | | | | 386/278 |
| 2023/0156144 | A1* | 5/2023 | Cui | H04N 23/683 |
| | | | | 386/248 |
| 2023/0352055 | A1* | 11/2023 | Bv | H04N 21/8405 |
| 2024/0233770 | A1* | 7/2024 | Fukuda | G11B 27/031 |
| 2024/0373105 | A1 | 11/2024 | Tomimori et al. | |

FOREIGN PATENT DOCUMENTS

| | | | | | |
|---|---|---|---|---|---|
| CN | 109120950 | A | | 1/2019 | |
| CN | 110691276 | A | | 1/2020 | |
| CN | 112449232 | A | | 3/2021 | |
| CN | 113411664 | A | | 9/2021 | |
| CN | 113473204 | A | * 10/2021 | | G06F 16/9538 |
| CN | 114374872 | A | | 4/2022 | |
| CN | 114450935 | A | | 5/2022 | |
| JP | 7130144 | B2 | | 9/2022 | |
| WO | WO-2021043223 | A1 | * 3/2021 | | |

OTHER PUBLICATIONS

European Patent Application No. 23821110.6; Extended Search Report; dated Nov. 5, 2024; 11 pages.
Japan Patent Application No. 2023-579311; Office Action; dated Jul. 8, 2025; 10 pages.
China Patent Application No. 202211231854.1; Office Action; dated Sep. 17, 2025; 26 pages.

\* cited by examiner

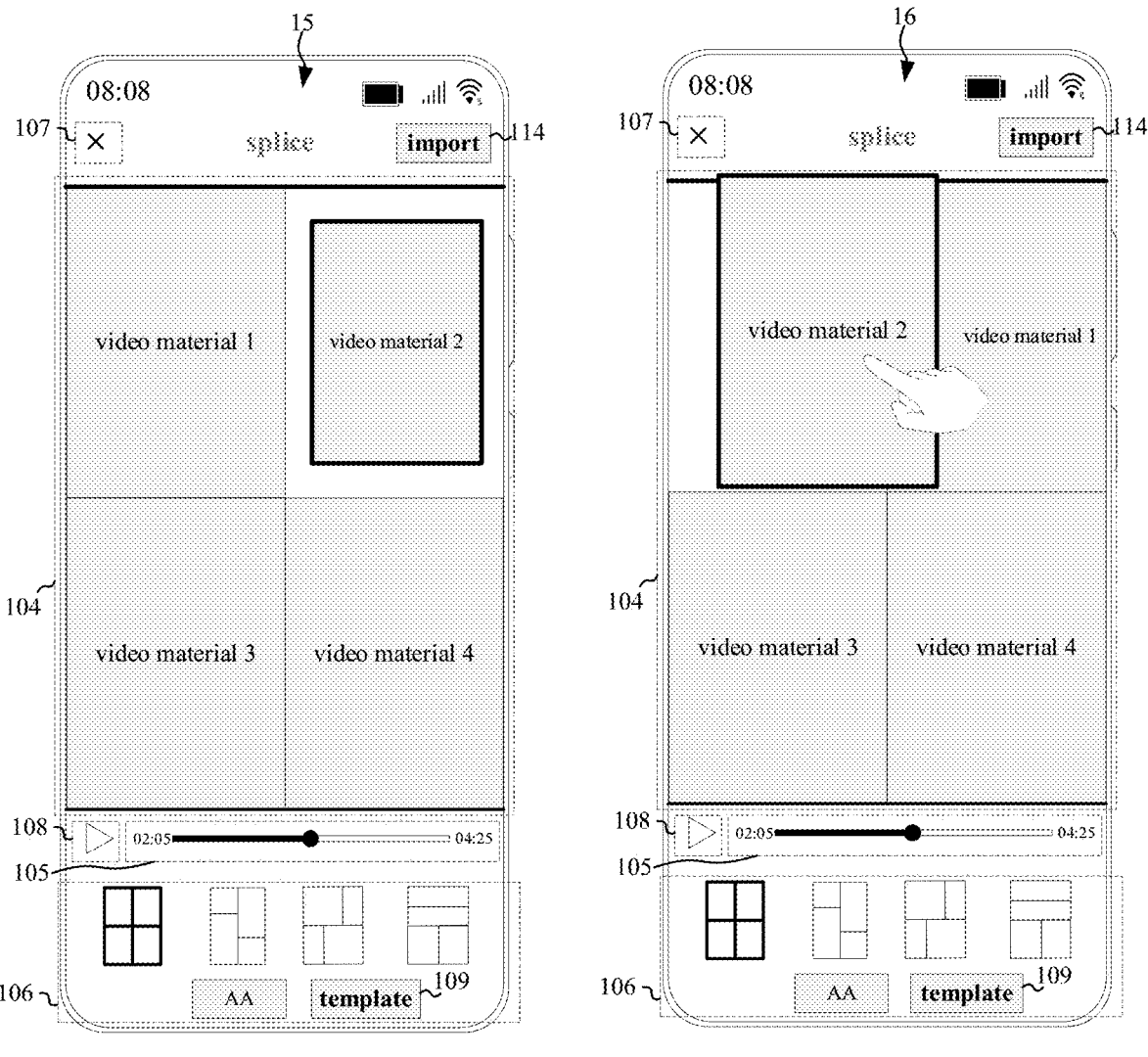
FIG.4E                                    FIG.4F

VIDEO MATERIAL EDITING METHOD AND APPARATUS

This application is a continuation of International Patent Application PCT/CN2023/121138, filed on Sep. 25, 2023, which claims priority of Chinese Patent Application No. 202211231854.1, filed on Sep. 30, 2022, both of which are incorporated herein by reference in their entireties.

TECHNICAL FIELD

The present disclosure relates to a video material editing method and an apparatus.

BACKGROUND

With rapid development of internet technology, users may clip videos or images through applications in electronic devices to obtain visually rich videos. In a video editing scenario, a user usually wants to splice a plurality of video materials to simultaneously exhibit a content of the plurality of video materials on a screen. Currently, a user manually layouts the video materials to achieve a desired splice effect, which is inefficient for video editing.

SUMMARY

In order to solve the above technical problems, the present disclosure provides a video material editing method and an apparatus.

The present disclosure provides a video material editing method, comprising:

acquiring a plurality of video materials;

determining a video split-screen template, the video split-screen template being used to indicate a plurality of split regions located in a same video image; and exhibiting a plurality of video track clips on a video editing track, and displaying a video editing image formed from video images of the plurality of video track clips according to the video split-screen template;

wherein the plurality of video track clips are formed based on the plurality of video materials, and at least a video material among the plurality of video materials is used to form a video track clip among the plurality of video track clips, video materials used to form different video track clips among the plurality of video track clips are different video materials in the plurality of video materials;

timeline intervals corresponding to the plurality of video track clips on the video editing track at least partially overlap with each other;

the video editing image has the plurality of split regions indicated by the video split-screen template; a split region in the video editing image is used to exhibit a video image of a video track clip among the plurality of video track clips, and different split regions in the video editing image are used to exhibit images of different video track clips among the plurality of video track clips.

In some embodiments, the method further comprising: entering a video clip page, based on the video split-screen template adopted for the plurality of video track clips, and displaying the video editing image formed from the video images of the plurality of video track clips according to the video split-screen template on the video clip page.

In some embodiments, after entering the video clip page, in a corresponding clip draft file, setting one of the video track clips as a video track clip on a main track, while setting all other the video track clips as video track clips on picture-in-picture tracks.

In some embodiments, the setting one of the video track clips as the video track clip on the main track, while setting all other the video track clips as the video track clips on the picture-in-picture tracks, comprises:

based on an order of acquiring the plurality of video materials, setting a video track clip formed from a first acquired video material as the video track clip on the main track, and setting video track clips respectively formed from other video materials as video track clips on the picture-in-picture tracks, when the plurality of video track clips are in one-to-one correspondence with the plurality of video materials.

In some embodiments, the displaying the video editing image formed from the video images of the plurality of video track clips according to the video split-screen template, comprises:

acquiring a size of a canvas corresponding to a video editing operation;

determining sizes and positions of the video images of the plurality of video track clips respectively in the canvas, based on a video editing track information of the plurality of video track clips that is acquired, a mapping relationship between the plurality of split regions indicated by the video split-screen template and the video editing tracks, and the size of the canvas;

filling the video images of the plurality of video track clips in the canvas, based on the sizes and the positions of the video images of the plurality of video track clips respectively in the canvas, and displaying the canvas to exhibit the video editing images formed from the video images of the plurality of video track clips according to the video split-screen template.

In some embodiments, time lengths of the plurality of video track clips formed based on the plurality of video materials are consistent with a length of the timeline, and start time points of the plurality of video track clips are aligned on the timeline.

In some embodiment, when forming a video track clip among the plurality of video track clips based on at least one video material of the plurality of video materials, the at least one video material is processed by adopting one or more of video processing modes of video speed varying, inserting or splicing a video clip with specified content, to acquire a video track clip whose time length is consistent with a length of the timeline.

In some embodiments, the method further comprising: displaying, in response to a video split-screen template switch instruction, video editing images formed from the video images of the plurality of video track clips according to the video split-screen template indicated by the video split-screen template switch instruction; the video split-screen template indicated by the video split-screen template switch instruction and the video split-screen template adopted before switch being different in layout of the plurality of split regions indicated thereby.

In some embodiments, the method further comprising: playing, in response to a preview playing instruction, video editing images formed from the video images of the plurality of video track clips according to the video split-screen template based on the timeline; wherein, during the playing process, when a preview playing position is located within the timeline interval covered by the video track clip on the timeline, the video image of the video track clip is displayed through the corresponding split region in the video editing image; if the preview playing position is located outside the timeline interval covered by the video track clip on the timeline, a preset background is displayed in the split region corresponding to the video track clip in the video editing image.

In some embodiments, the method further comprising: in response to an adjustment instruction for the video track clip, adjusting a position, a direction or a size of the video image of the video track clip in the corresponding split region; or, exchanging split regions corresponding to video images of different the video track clips; or, replacing the video track clip in the split region; or, displaying the video image of the video track clip in a mirrored manner in the corresponding split region.

The present disclosure provides a video material editing apparatus, comprising:

an acquiring module, configured to acquire a plurality of video materials;

a template determining module, configured to determine a video split-screen template, the video split-screen template being used to indicate a plurality of split regions located in a same video image;

a video processing module, configured to exhibit a plurality of video track clips on a video editing track, and forming a video editing image from video images of the plurality of video track clips according to the video split-screen template; and a display module, configured to display the video editing image;

wherein the plurality of video track clips are formed based on the plurality of video materials; and at least one video material among the plurality of video materials is used to form a video track clip among the plurality of video track clips; video materials used to form different video track clips among the plurality of video track clips are different video materials in the plurality of video materials;

timeline intervals corresponding to the plurality of video track clips on the video editing track at least partially overlap with each other;

the video editing image has the plurality of split regions indicated by the video split-screen template; a split region in the video editing image is used to exhibit a video image of a video track clip among the plurality of video track clips, and different split regions in the video editing image are used to exhibit images of different video track clips among the plurality of video track clips.

The present disclosure provides an electronic device, comprising: a memory and a processor; wherein the memory is configured to store computer program instructions;

the processor is configured to execute the computer program instructions, and the electronic device executes the computer program instructions, so that the electronic device implements the video material editing method as described above.

The present disclosure provides a readable storage medium, comprising: computer program instructions; wherein an electronic device executes the computer program instructions, so that the electronic device implements the video material editing method as described above.

The present disclosure provides a computer program product, wherein an electronic device executes the computer program product, so that the electronic device implements the video material editing method as described above.

The embodiment of the present disclosure provides a video material editing method and an apparatus, wherein the video material editing method comprises: acquiring a plurality of video materials, and determining a video split-screen template. By exhibiting a plurality of video track clips formed based on the plurality of video materials on a video editing track, and displaying a video editing image formed from video images of the plurality of video track clips according to a video split-screen template, video images of the plurality of video track clips are exhibited through a plurality of split regions in the video editing image in a split-screen manner; at least one video material among the plurality of video materials is used to form one video track clip among the plurality of video track clips, and video materials used to form different video track clips are not completely identical; when performing video split-screen splice, timeline intervals corresponding to the plurality of video track clips on the video editing track at least partially overlap with each other. The method according to the present disclosure may implement rapid split-screen splice of a plurality of video materials through a video clip tool, without manual adjustment, which meets video editing needs of users who want to rapidly splice video materials. Moreover, automatic video split-screen splice improves efficiency of video material editing.

BRIEF DESCRIPTION OF THE DRAWINGS

The accompanying drawings here are incorporated into the specification and form a part of this specification, showing embodiments that comply with the present disclosure, and are used together with the specification to explain the principles of the present disclosure.

In order to clearly illustrate the embodiments of the present disclosure, the drawings that need to be used in the embodiments will be briefly described in the following; it is obvious that based on the drawings, those ordinarily skilled in the art can acquire other drawings, without any inventive operation.

FIG. 4A to FIG. 4I are schematic diagrams of a human-machine interaction interface provided by the present disclosure.

DETAILED DESCRIPTION

Figure 1:
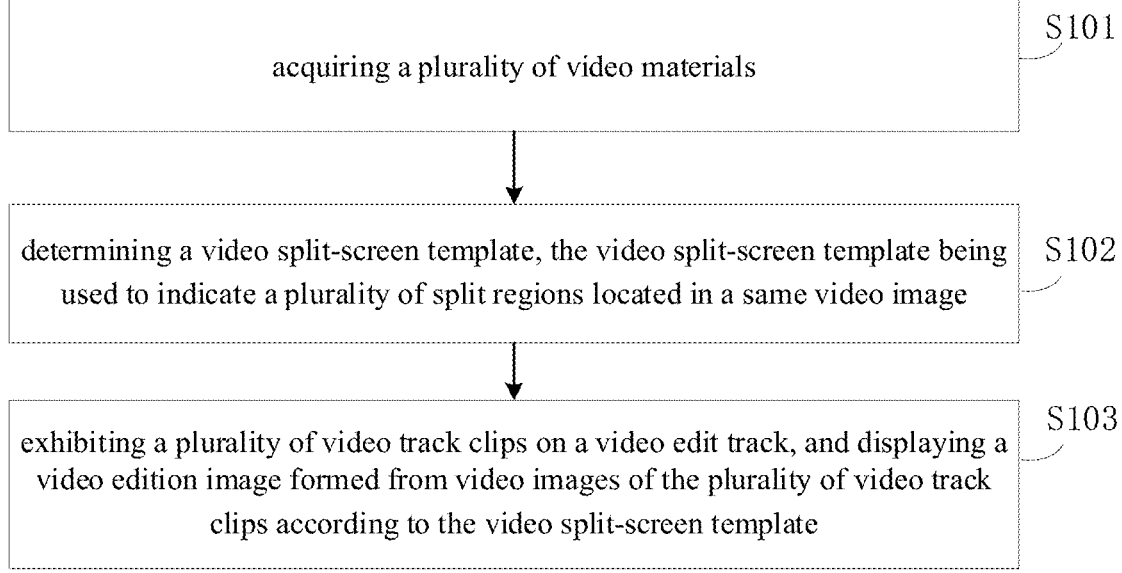
FIG. 1 is a schematic flow chart of a video material editing method provided by an embodiment of the present disclosure.

In order to better understand the above-described objectives, features, and advantages of the present disclosure, the solution of the present disclosure will be further described below. It should be noted that in case of no conflict, the embodiments of the present disclosure and the features in the embodiments may be combined with each other.

Many specific details have been elaborated in the following description to facilitate full understanding of the present disclosure, but the present disclosure may also be implemented in other ways different from those described here; obviously, the embodiments in the specification are only some of the embodiments of the present disclosure, rather than all of them.

Exemplarily, the present disclosure provides a video material editing method and an apparatus, which exhibits a plurality of video track clips formed based on a plurality of video materials on a video editing track, and displays a video editing image formed from video images of the plurality of video track clips according to a video split-screen template, to exhibit video images of the plurality of video track clips through a plurality of split regions in the video editing image in a split-screen manner; at least one video material among the plurality of video materials is used to form one video track clip among the plurality of video track clips, and video materials used to form different video track clips are not completely identical; when performing video split-screen splice, timeline intervals corresponding to the plurality of video track clips on the video editing track at least partially overlap with each other, to ensure a video split-screen splice effect. The method according to the present disclosure may implement rapid split-screen splice of the plurality of video materials through a video clip tool, without manual adjustment, which meets video editing needs of users who want to rapidly splice video materials, and an automatic video split-screen splice improves efficiency of video material editing.

In addition, the video clip tool may provide a user with a visual component to trigger video split-screen splice, which is convenient for the user to operate and is favorable for improving editing experience of the user.

The video material editing method according to the present disclosure is executed by an electronic device. The electronic device may be an Internet of Things (IOT) device such as a tablet personal computer, a mobile phone (e.g., a foldable screen phone, a large screen phone, etc.), a wearable device, a vehicle-mounted device, an Augmented Reality (AR)/Virtual Reality (VR) device, a laptop, an Ultra-Mobile Personal Computer (UMPC), a netbook, a Personal Digital Assistant (PDA), a smart television, a smart screen, a high-definition television, a 4K television, a smart speaker, a smart projector; and a specific type of the electronic device will not be limited in the present disclosure. A type of an operating system of the electronic device will not be limited in the present disclosure, which may be, for example, Android system, Linux system, Windows system, iOS system, etc.

Based on the foregoing description, the video material editing method provided by the present disclosure will be explained in detail by taking an electronic device as an example, in conjunction with the accompanying drawings and application scenarios.

FIG. 1 is a schematic flow chart of a video material editing method provided by an embodiment of the present disclosure. As shown in FIG. 1, the method according to this embodiment comprises:

S101: acquiring a plurality of video materials.

In some embodiments, the electronic device may exhibit a material selection page to a user, wherein the material selection page is used to exhibit, in an aggregated manner, identifier information of a video material that the user may select for edition, for example, exhibit a video and an image in an album of the electronic device in a thumbnail format; and the electronic device may acquire the plurality of video materials based on selection of the user.

Quantity, video content, format, resolution, and other parameters of the plurality of video materials selected by the user will not be limited in the present disclosure.

In some embodiments, in order to ensure the effective of video split-screen splice, the minimum amount of video materials that need to be acquired may be set; for example, at least 2 video materials need to be acquired; if the amount of video materials selected by the user is less than the minimum amount of video materials that need to be acquired, the electronic device may exhibit prompt information to the user, prompting the user to add video materials.

In some other embodiments, in order to avoid a poor splice effect that pictures of the video editing image formed through split-screen splice are disordered due to the excessive amount of video track clips formed from the excessive amount of video materials, therefore the maximum amount of video materials that may be acquired may be set, when the maximum amount of video materials that may be acquired is exceeded, the electronic device may also exhibit prompt information to the user, prompting the user to delete video materials, and of course, the maximum amount of video materials that may be acquired may not be limited.

S102: determining a video split-screen template, the video split-screen template being used to indicate a plurality of split regions located in a same video image.

The electronic device may determine the video split-screen template in response to a video split-screen splice instruction input by the user, or the electronic device may also determine the video split-screen template before the user starts editing creation but does not select video materials.

In some embodiments, the electronic device may display a target control on a page exhibited to the user; and the user may input the video split-screen splice instruction to the electronic device by operating the target control. Exemplarily, the target control may be, but is not limited to, exhibited on the material selection page. The target control may be implemented in any mode, and parameters such as size, position, style, effect, etc. of the target control will not be limited in the present disclosure. For example, the style of the target control may be displayed in a form such as text, letter, digit, icon, image, etc.

In some other embodiments, the electronic device exhibits a pop-up window to the user, asking if the user needs to perform video material split-screen splice; based on confirmation of the user, the video split-screen splice instruction is input to the electronic device; if the user selects to skip, it may enter a video clip page based on the acquired plurality of video materials according to the existing mode in the video clip tool in the electronic device for video material editing. Of course, other modes such as voice, gesture, combined gestures, etc. in which the user inputs the video split-screen splice instruction to the electronic device will not be limited.

The amount of split regions indicated by the video split-screen template determined in the step may be consistent with or inconsistent with the amount of video materials selected by the user, which will not be limited in the present disclosure. In some embodiments, the amount of video materials may be taken as a basis for matching a video split-screen template having spit screens whose amount is consistent with the amount of video materials; and in some other embodiments, a preset mode or random selection or a strategy for forming video track clips based on video materials may also be taken as a basis for determining the video split-screen template.

Implementation for determining the video split-screen template will not be limited in the present disclosure.

In addition, it should be noted that an execution order of step S101 and step S102 according to this embodiment may be non-sequential.

The electronic device may pre-store video split-screen templates supporting a plurality of different amounts of split regions to constitute a video split-screen template set; when receiving the video split-screen splice instruction, the amount of video materials selected by the user for the video clip is taken as a basis for matching from the video split-screen template set, and a video split-screen template to be used is determined from a plurality of candidate splice templates successfully matched. The video split-screen template to be used may be determined based on one or more of the amount of times for use, the amount of times for collection, or information of the video split-screen template used by the user in historical video clips; or an arbitrary candidate splice template may be randomly determined as the video split-screen template to be used.

In other embodiments, the video split-screen template may also be pre-specified, for example, a video split-screen template respectively corresponding to a 2-split screen, a 3-split screen, and a 4-split screen may be pre-specified; when receiving the video split-screen splice instruction, a pre-specified video split-screen template having the corresponding amount of split screens may be determined as the video split-screen template to be used based on the determined amount of split screens.

S103: exhibiting a plurality of video track clips on the video editing track, and displaying a video editing image formed from the video images of the plurality of video track clips according to the video split-screen template.

After acquiring the plurality of video materials and determining the video split-screen template, it may enter a split-screen splice page; when entering the split-screen splice page, video track clips whose amount is consistent with the amount of split regions indicated by the video split-screen template may be formed based on the plurality of video materials, the plurality of video track clips are exhibited on the video editing track, and the video editing image formed from the video images of the plurality of video track clips according to the video split-screen template are exhibited on the split-screen splice page.

The plurality of video track clips are formed based on the plurality of video materials, and at least one video material among the plurality of video materials is used to form one video track clip among the plurality of video track clips. Specific implementations for forming video track clips through video materials will not be limited in the present disclosure. For example, video track clips corresponding to the video materials may be generated without performing any video processing on the video materials; or one or more video processing modes, such as splicing, speed varying, loop repeating, or inserting a video clip with specified content may also be performed on at least one video material for forming one video track clip, to acquire a corresponding video track clip. In addition, time lengths of the formed plurality of video track clips may be exactly the same, or may also be not exactly the same, or may also be completely different, which will not be limited in the present disclosure.

In addition, the video materials used to form different video track clips among the plurality of video track clips are different video materials among the plurality of video materials, that is, the video materials used to form different video track clips may be completely different video materials among the plurality of video materials, or may also be video materials not completely identical. For example, if there are video materials 1 to 3, video track clips 1 to 3 may be respectively formed based on video materials 1 to 3, in which way the video materials that form different video track clips are completely different video materials; or, video material 1 and 2 may be used to form video track clip 1, and video material 2 and 3 may be used to form video track clip 2, in which way the video materials that form different video track clips are video materials not completely identical.

In video editing, the plurality of video track clips formed based on the plurality of video materials are exhibited on corresponding video editing tracks, wherein one video editing track correspondingly exhibits one video track clip; the solution may include a plurality of video editing tracks, and the amount of video editing tracks may be consistent with the amount of video track clips.

In this embodiment, timeline intervals corresponding to the plurality of video track clips on the video editing track at least partially overlap with each other. A timeline length of the video editing track may be determined by a longest video track clip. For example, if time lengths of the plurality of video track clips are consistent and the corresponding timeline intervals on the video editing track are aligned, it may be understood as that the plurality of video track clips completely overlap with each other in a time dimension. If the time lengths of the plurality of video track clips are inconsistent, or if the time lengths of the plurality of video track clips are consistent but not fully aligned on the video editing track, there may be different video track clips that overlap with each other in different moment positions on the video editing track. Therefore, by ensuring that the timeline intervals corresponding to the plurality of video track clips on the video editing track at least partially overlap with each other, it may be ensured that the video split-screen splice has a significant split-screen splice effect within a range in which the timeline intervals overlap with each other.

The electronic device may exhibit the split-screen splice page to the user, and display the video editing image in the split-screen splice page, so that the user is capable of previewing the splice effect of split-screen splice with the video materials through the split-screen splice page. The video editing image has a plurality of split regions indicated by the video split-screen template. One split region in the video editing image is used to exhibit a video image of one video track clip among the plurality of video track clips, and different split regions in the video editing image are used to exhibit images of different video track clips among the plurality of video track clips. It may also be understood as that the plurality of split regions in the video editing image are in one-to-one correspondence with the plurality of video track clips. A size of the video editing image may be different from a size of the display region exhibiting the video editing image on the split-screen splice page, the size of the video editing image may be adjusted to adapt to the size of the corresponding display region, to ensure that the video editing image may be fully displayed on a display screen of the electronic device.

Due to differences in the time lengths of the plurality of video track clips, and alignment of timeline intervals of the plurality of video track clips on the video editing track, there may be differences in the video track clips overlapping with each other in different preview display positions; for example, all video track clips overlap with each other in some preview display positions, while only some video track clips overlap with each other in some preview display positions.

Therefore, when displaying the video editing image, it may be implemented based on modes below:

If the preview display position on the timeline is located within the timeline interval corresponding to the video track clip, then the split region corresponding to the video track clip in the video editing image displays the video image corresponding to the video track clip in the corresponding preview display position; if the preview display position on the timeline is located outside the timeline interval corresponding to the video track clip, then the split region corresponding to the video track clip in the video editing image displays a preset background, for example, a black background, presenting a black screen display effect; of course, other set backgrounds may also be displayed, for example, other solid color backgrounds or patterned backgrounds.

The method according to the present disclosure may implement rapid split-screen splice of a plurality of video track clips formed based on a plurality of video materials through a video clip tool, without manual adjustment, which meets editing needs of the users who want rapid the video split-screen splice, and the automatic video split-screen splice improves efficiency of the video material editing.

On the basis of the embodiment shown in FIG. 1, the displaying the video editing image formed from the video images of the plurality of video track clips according to the video split-screen template may be implemented in modes below:

Step a1: acquiring a size of a canvas corresponding to a video editing operation.

Step a2: determining sizes and positions of the video images of the plurality of video track clips respectively in the canvas, based on a video editing track information of the plurality of video track clips that is acquired, a mapping relationship between the plurality of split regions indicated by the video split-screen template and the video editing tracks, and the size of the canvas.

In some embodiments, based on the corresponding relationship between the plurality of video track clips and the plurality of split regions indicated by the video split-screen template, the split regions corresponding to the plurality of video track clips are determined; the size of the canvas may be consistent with the size of the video image; so the respective split regions indicated by the video split-screen template may be mapped into different canvas regions of the canvas; there is a corresponding relationship between the split region and the canvas region; determining the split regions corresponding to the respective video track clips is equivalent to determining the canvas regions corresponding to the respective video track clips; and the size and the position of the split region corresponding to the video track clip are just the size and the position of the video image of the video track clip respectively in the canvas.

Step a3: adjusting the sizes of the video images of the plurality of video track clips to be consistent with the sizes of the corresponding split regions, based on the sizes of the video images of the plurality of video track clips respectively in the canvas, and then filling the video images having sizes adjusted in the canvas based on the positions of the video images of the video track clip in the canvas.

Step a4: displaying the canvas, to exhibit the video editing image formed from the video images of the plurality of video track clips according to the video split-screen template.

Figure 2:
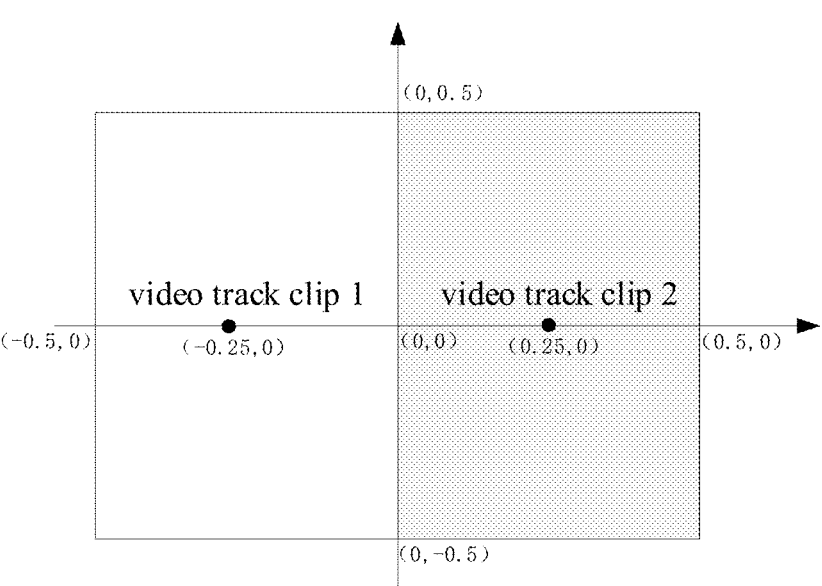
FIG. 2 is a schematic diagram of performing video split-screen splice with a video split-screen template supporting 2 video track clips to adopt a left-right 2-split screen, as exemplarily shown in the present disclosure.

The size of the canvas filled with the video images of the plurality of video track clips may be inconsistent with the screen region size used to exhibit the video editing image in the display screen of the electronic device; during display, the size of the canvas and the size of the video image on the canvas may be adjusted to adapt to the corresponding screen region size; it should be noted that, adjusting the size of the canvas and the size of the video image here is for adaptive display and does not affect the size of the target video that has been clipped and exported during video split-screen splice and the entire editing process. As shown in FIG. 2, by taking video split-screen splice with two video track clips as an example, assuming that the corresponding video split-screen template is a left-right 2-split video split-screen template, the example of the left-right 2-split video split-screen template is as shown by box S1 in FIG. 2; when video track clip 1 and video track clip 2 undergo split-screen splice, it may be determined that video track clip 1 corresponds to a left split region S1$a$ and video track clip 2 corresponds to a right split region S1$b$, according to a sequence of video editing tracks respectively corresponding to video track clips 1 and 2, and a corresponding relationship between the split regions S1$a$ and S1$b$ in the split-screen splice template. Assuming that the size of the canvas for video editing is consistent with the size of the video split-screen template, next, the size and the position of the video image of video track clip 1 in the canvas are determined, based on the size and the position of the split region Sla, wherein a height of the video image of video track clip 1 is consistent with a height of the canvas, and a width of the video image of video track clip 1 is equal to half of the width of the canvas; further the position of the video image of video track clip 1 in the canvas is determined, based on the position of the split region Sla; assuming a canvas center is an origin, a normalized coordinate range is −0.5 to 0.5 along a horizontal axis and a vertical axis, coordinate points of some positions are as shown in FIG. 2; and a coordinate position of a center of video track clip 1 in the canvas is (−0.25, 0). Video track clip 2 is processed in a similar way, it may be determined that a height of a video image of video track clip 2 in the canvas is consistent with the height of the canvas, a width thereof is half the width of the canvas, and a normalized coordinate position of a center of video material 2 in the canvas is (0.25, 0). Afterwards, the video images of video track clips 1 and 2 having sizes adjusted are filled into the canvas according to the normalized coordinate positions where their respective centers are located in the in the canvas.

It should be noted that FIG. 2 is exemplarily illustrated by taking that a left-right 2-split video split-screen template is adopted for 2 video track clips; for a larger amount of video track clips, a processing procedure of adopting the video split-screen template to implement video split-screen splice is similar.

Figure 3:
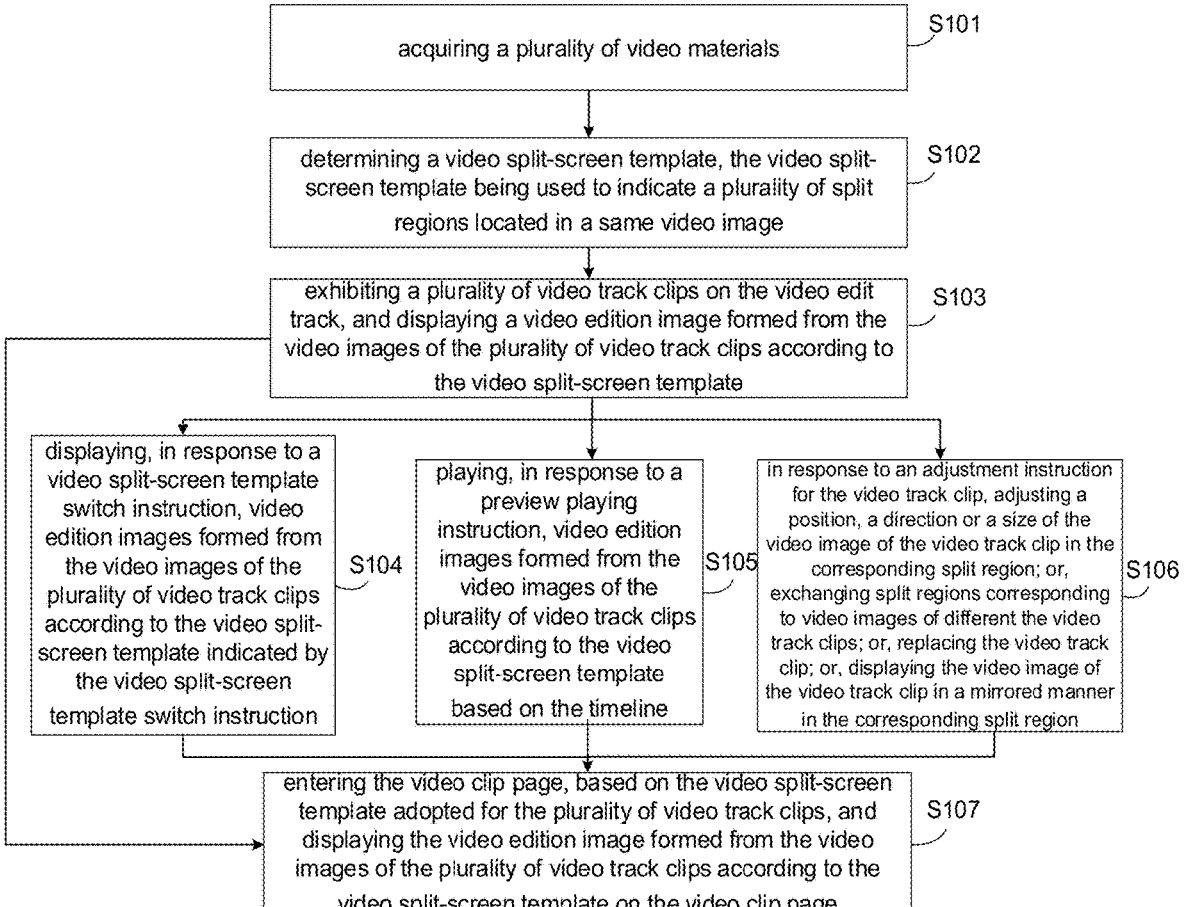
FIG. 3 is a schematic flow chart of a video material editing method provided by another embodiment of the present disclosure.

FIG. 3 is a schematic flow chart of a video material editing method provided by another embodiment of the present disclosure.

As shown in FIG. 3, optionally, on the basis of the embodiment shown in FIG. 1, S103 further includes:

S104: displaying, in response to a video split-screen template switch instruction, video editing images formed from the video images of the plurality of video track clips according to the video split-screen template indicated by the video split-screen template switch instruction.

The video split-screen template indicated by the video split-screen template switch instruction and the video split-screen template adopted before switch are different in layout of the plurality of split regions indicated thereby, but support the same amount of split regions. The layout of the plurality of split regions indicated by the video split-screen template may be reflected by the sizes and the positions of the plurality of split regions.

The electronic device applies the video split-screen template indicated by the video split-screen template switch instruction to the plurality of video track clips by responding to the video split-screen template switch instruction, forms the video editing image from the video images of the plurality of video track clips according to the video split-screen template indicated by the video split-screen template switch instruction, and exhibits the same on the split-screen splice page, allowing the user to preview the video split-screen splice effect. An implementation of applying the video split-screen template indicated by the video split-screen template switch instruction to the plurality of video track clips to form the video editing image and an implementation of exhibiting the video editing image are similar to the implementations shown in FIG. 1, for which detailed description of the embodiment shown in FIG. 1 may be referred to; and for simplicity, no details will be repeated here.

The electronic device may exhibit one or more video split-screen templates on the split-screen splice page for selection by the user, respond to a trigger operation of the user for any one of the video split-screen templates, and acquire the video split-screen template switch instruction.

The present disclosure, by exhibiting other optional video split-screen templates to the user, and supporting the user in switching between the video split-screen templates, and replacing the split-screen splice effect presented by the video editing image formed from the video image of the video track clip based on the video split-screen template, meets editing needs of the user.

As shown in FIG. 3, optionally, on the basis of the embodiment shown in FIG. 1, after S103, the method further comprises:

S105: playing, in response to a preview playing instruction, video editing images formed from the video images of the plurality of video track clips according to the video split-screen template based on the timeline.

In some embodiments, a playing control may be exhibited on the split-screen splice page; the user may input a preview playing instruction to the electronic device by operating the playing control; the electronic device plays, in response to the preview playing instruction and based on the timeline, the video editing image formed from the video images of the plurality of video track clips according to the video split-screen template, wherein an effect presented by preview playing is the plurality of video track clips being simultaneously played in their respective corresponding split regions.

During the playing process, when a preview playing position is located within the timeline interval covered by the video track clip on the timeline, the video image of the video track clip is displayed through the corresponding split region in the video editing image; if the preview playing position is located outside the timeline interval covered by the video track clip on the timeline, a preset background is displayed in the split region corresponding to the video track clip in the video editing image.

Taking the video split-screen template shown in FIG. 2 as an example, assuming that video track clip 1 has a time length of 5 seconds, video track clip 2 has a time length of 8 seconds, and timeline intervals of video track clips 1 and 2 of the video editing track are aligned, then, from the 0th second to the 5th second on the timeline, the 2 video track clips are played simultaneously in their respective corresponding split regions; from the 5th second to the 8th second, since the time length of video track clip 1 is not long enough, and the timeline interval corresponding thereto does not cover the period from the 5th second to the 8th second on the timeline, the split region S1a displays a black background, and the split region S1b displays a video image of video track clip 2 during the period from the 5th second to the 8th second. After the playing ends, it is automatically positioned to a start time position of the timeline.

In addition, during the preview playing process, some trigger operations by the user may interrupt preview playing, for example, clicking to switch the selected video track clip, switching a video split screen, or clicking on the display region used to display the video editing image (i.e. a preview playing picture) in the split-screen splice page during the playing process will trigger pausing playing; a visual effect presented by pausing playing refers to the plurality of video track clips simultaneously pausing playing. On this basis, if the user triggers the playing control again, it continues to play from the preview display position where pausing is triggered.

In addition, during the preview playing process, the user may also control pausing playing by triggering the playing control again.

The present disclosure supports the user in preview playing of the video split-screen splice effect on the split-screen splice page, so that the user may clearly learn through preview whether the editing effect of the video exported in the current video split screen mode meets expectations.

As shown in FIG. 3, optionally, on the basis of the embodiment shown in FIG. 1, after S103, the method further includes:

S106: in response to an adjustment instruction for the video track clip, adjusting a position, a direction or a size of the video image of the video track clip in the corresponding split region; or, exchanging split regions corresponding to video images of different the video track clips; or, replacing the video track clip; or, displaying the video image of the video track clip in a mirrored manner in the corresponding split region.

The adjustment instruction input based on different trigger modes correspond to different adjustment modes as shown above. For example, after selecting a video track clip to be adjusted in the display region exhibiting the video editing image on the split-screen splice page, a position, a direction or a size of the video image of the selected video track clip in the corresponding split region may be adjusted through a gesture or a gesture combination; after selecting a video track clip to be adjusted, the video track clip may be dragged to a split region corresponding to another video track clip and releasing, so that split regions corresponding to two video track clips may be exchanged; after selecting the video track clip to be adjusted, the electronic device may be triggered to display a corresponding function panel; and controls provided in the function panel may trigger replacing the video track clip or displaying the video image of the video track clip in a mirrored manner in the corresponding split region. It should be noted that the adjustments as shown above may be made to, but not limited to, all video images for video track clips.

Of course, triggering different adjustments may be implemented, but not limited to, through the examples above. For example, adjustments of the position, the size and the direction of the video image of the video track clip in the split region may also be triggered through corresponding controls in the split-screen splice page.

The present disclosure, by supporting the user in making one or more adjustments above to the video track clip during the video split-screen splice process, achieves a video splice effect that meets expectations of the user and meets video editing needs of the user.

It should be noted that the user may select to execute any step from step S104 to step S106, or may also repeat one or more of the steps therein; when the user executes a plurality of steps therein, an order of the plurality of steps will not be limited; for example, the user may execute step S105 for preview, then execute step S106 to adjust the video track clip, and then execute step S105 for preview playing.

On the basis of step S104 to step S106 shown in FIG. 1 and FIG. 3, the user determines that the video split-screen splice effect meets expectations, and the electronic device may enter the video clip page, to execute other operations such as clip operations, exporting videos, etc. As shown in FIG. 3, optionally, the method may further comprise:

S107: entering the video clip page, based on the video split-screen template adopted for the plurality of video track clips, and displaying the video editing image formed from the video images of the plurality of video track clips according to the video split-screen template on the video clip page.

After the split-screen splice is completed, the plurality of video track clips and the information of video split-screen splice corresponding to the plurality of video track clips may be imported into a corresponding clip draft file in response to a trigger operation of the user, and a corresponding clip page may be exhibited; the video editing image formed from the video images of the plurality of video track clips according to the video split-screen template is displayed in a preview region of the clip page.

And in a corresponding clip draft file, one video track clip among the plurality of video track clips is set as a video track clip on a main track, while other video track clips except the video track clip on the main track are set as video track clips on picture-in-picture tracks.

In some embodiments, if the video track clips in one-to-one correspondence with the video materials are formed based on the plurality of video materials, then in the clip draft file, a video track clip formed from a first video material acquired based on an order of acquiring the plurality of video materials may be set as the video track clip on the main track, and video track clips respectively formed from other video materials may be set as video track clips on the picture-in-picture tracks.

The plurality of video track clips are assigned to the main track and the picture-in-picture tracks; in the video clip tool, the existing logical framework of the video clip tool may be utilized to respond to subsequent clip operations of the user according to the picture-in-picture processing logic.

It should be noted that after entering the clip page, the user may execute a new clip operation through the clip page, and then export a clipped target video, or may also export the clipped target video without executing a new clip operation.

In order to introduce the video material editing method provided by the present disclosure more clearly, hereinafter, a specific implementation process of the video material editing method according to the present disclosure will be introduced in conjunction with FIG. 4A to FIG. 4I. For convenience of illustration, in FIG. 4A to FIG. 4I, the electronic device is taken as a mobile phone, in which APP 1 supporting a video editing function is installed.

Please refer to FIG. 4A to FIG. 4I, which are schematic diagrams of a human-machine interaction interface provided by an embodiment of the present disclosure.

Figures 4A, 4B:
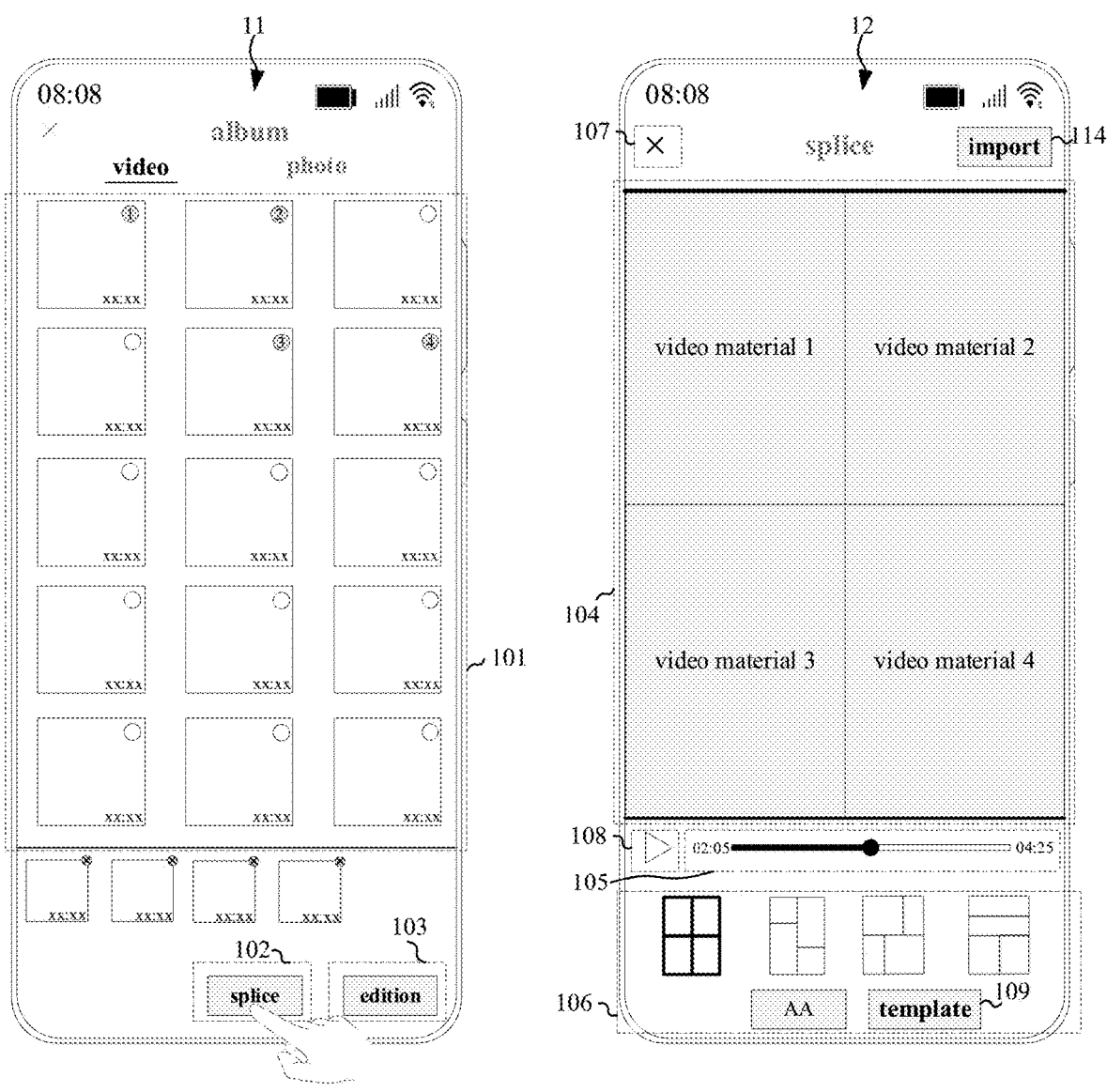

APP 1 may display user interface 11 shown in FIG. 4A on the mobile phone; user interface 11 is used to display a material selection page of APP 1; it may enter the material selection page through a creation entry provided on a home page of APP 1, or through other entry/path provided by APP 1; modes of entering the material selection page will not be limited in the present disclosure. APP 1 may exhibit identifiers of materials to the user on the material selection page in an aggregate manner, and based on user operations, select materials, trigger split-screen splice, enter a clip project, and so on, As shown in FIG. 4A, user interface 11 comprises: region 101, control 102, and control 103.

Region 101 may exhibit thumbnails of materials such as images, photos, videos, etc. included in an album; a plurality of tags may be set in region 101, according to different categories of exhibitions; thumbnails of materials under corresponding tags are exhibited in an aggregate manner based on the selected tags; due to size limitation of region 101, region 101 may not be capable of displaying thumbnails of materials all at once; the user may view more materials through an up-down sliding operation. In region 101, each material corresponds to an exhibition region a1; thumbnails of corresponding materials are exhibited in region a1; if it is a video material, a time length of the video material may also be displayed in region a1. When the user selects a certain material, a select mark and order information may be displayed in region a1, and display styles (e.g., color, edge line, brightness, etc. of region a1) of the selected material may be different, to distinguish between the selected material and unselected materials.

Control 102 is used to trigger video split-screen splice for the acquired video materials, so, control 102 may also be understood as an entry to enter the split-screen splice page. A name of control 102 may be "splice".

Control 103 is used to trigger importing the selected video materials into a clip draft and entering the clip page for video material editing, wherein APP 1 may execute a function set on the imported materials on the clip page, for example, adding special effects, stickers, picture-in-picture, text, audio, etc.

The display styles of control 102 and control 103 will not be limited in the present disclosure.

It should be noted that if the material selected by the user is an image or a photo, when entering the split-screen splice page based on control 102 or directly entering the video clip page through control 103, APP 1 may generate a video material with a preset time length based on the image or the photo; the preset time length will not be limited in the present disclosure, for example, the preset time length may be 2 seconds, 3 seconds, etc.

Assuming that in the material selection page, the user selects 4 video materials, and when entering the split-screen splice page, APP 1 forms video track clips 1 to 4 in one-to-one correspondence with the 4 video materials based on the 4 video materials, it is illustrated here by taking that no video processing is performed, so video track clips 1 to 4 formed may be understood as original video materials 1 to 4.

After receiving the operation of the user such as clicking on control 102 in the user interface 11 shown in FIG. 4A, APP 1 generates a video split-screen splice instruction based on the operation of the user and responds to the video split-screen splice instruction; APP 1 exemplarily displays user interface 12 shown in FIG. 4B on the mobile phone; user interface 12 is used to display the split-screen splice page; and on the split-screen splice page, a video split-screen splice effect may be previewed and the video split-screen splice effect may be adjusted.

User interface 12 comprises: region 104, region 105, region 106, control 107, and control 108.

Region 104 is a preview region of the video editing image formed from video images of a plurality of video materials according to a video split-screen splice template determined by APP 1. Assuming that APP 1 automatically matches video split-screen template 1 for the plurality of video materials, as shown in FIG. 4B, 4 split regions indicated by video split-screen template 1 have a same size and are arranged in two rows and two columns; video material 1 corresponds to a split region in a 1st row and a 1st column, video material 2 corresponds to a split region in the 1st row and a 2nd column, video material 3 corresponds to a split region in a 2nd row and the 1st column, and video material 4 corresponds to a split region in the 2nd row and the 2nd column.

Region 105 is used to exhibit a progress bar. The progress bar is capable of reflecting playing progress and is also capable of displaying a timeline of the video editing track. Moreover, the progress bar supports manual drag of the user.

Figure 4C:
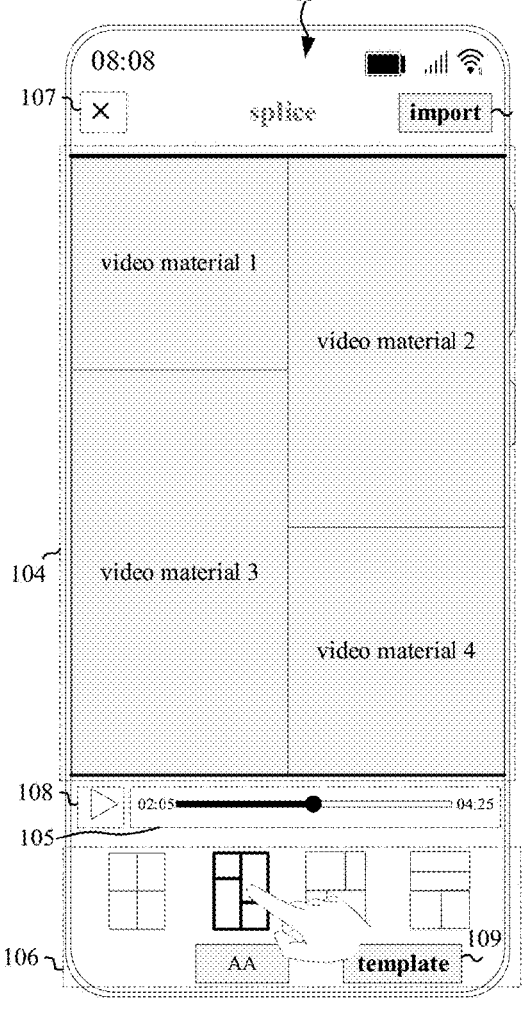
Figure 4D:
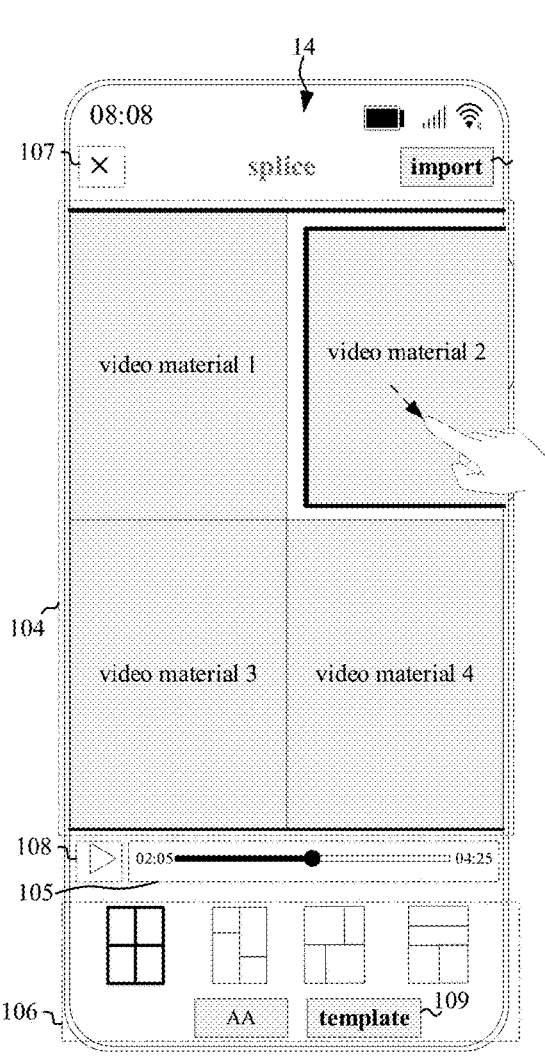

Region 106 may include tag 109, wherein tag 109 is used to trigger displaying more video split-screen templates supporting 4 video materials in region 106; when the user clicks on tag 109, region 106 may display the preset amount of video split-screen templates supporting 4 video materials, which are arranged in a set mode, for example, horizontally arranged from left to right, positioning to currently adopted video split-screen template 1 by default; and video split-screen template 1 may be displayed in a leftmost position of region 106. Exemplarily, as shown in FIG. 4B, region 106 exhibits 4 video split-screen templates, respectively video split-screen templates 1 to 4, and video split-screen template 1 is selected by default; assuming that the user clicks on video split-screen template 2, APP 1 may exemplarily display user interface 13 as shown in FIG. 4C on the mobile phone, region 104 in user interface 13 exhibits a canvas, video images of the 4 video materials on the canvas are formed into a video editing image according to a plurality of split regions indicated by video split-screen template 2, the corresponding video editing image is displayed in region 104, and video split-screen template 2 in region 106 is in a selected state. Exhibiting a video split-screen template having split regions whose amount is consistent with the amount of video materials selected by the user in region 106 may facilitate the user to quickly select and switch the video split-screen template he/she wants to use, which is favorable for improving editing efficiency.

It should be noted that region 106 may further include other tags, for example, a tag named "AA" in region 106; the tag may correspond to a specified function panel, which will not be specifically limited here; and the tag for which function to set in the split-screen splice page may be determined according to needs.

Control 107 serves as an entry for exiting the split-screen splice page; APP 1 receives a trigger operation of the user for control 107 and may return to display the material selection page shown in FIG. 4A; the material selection page is in a state before the entry, and the previously selected material is still in the selected state. The user may enter the split-screen splice page through control 102 multiple times, and then exit the split-screen splice page through control 107 to return to the material selection page.

Control 108 is a playing control and is capable of controlling exhibiting the video editing image formed from the plurality of video materials according to the video split-screen template in region 104 according to the timeline, thereby presenting an effect of simultaneous play or pause of the respective video materials in their respective corresponding split regions. In some embodiments, it enters the split-screen splice page shown in FIG. 4B through the material selection page, a playing progress is a time position of a first frame by default and is in a paused state. The user may re-position the preview display position by dragging the progress bar in region 105, and control simultaneous play/pause of the 4 video materials in their respective split regions by operating control 108. Since the plurality of video materials have different time lengths, a split region corresponding to a video material with a short time length may be displayed as, but not limited to, a black screen after playing ends.

With further reference to FIG. 4B, the corresponding split regions exhibiting different video materials in region 104 are operable; and the user may select a video material through a split region corresponding to the video material and may adjust the video material in region 104.

In some embodiments, the user may select a video material by clicking on a split region corresponding to the video material in region 104; a display style of the selected video material may be different from display styles of other unselected video materials in region 104, for example, the selected video material may be displayed in a semi-transparent manner; and any adjustment as described above may be performed on the selected video material through different operations.

I. Adjusting a Position of the Video Image of the Video Material in the Corresponding Split Region Assuming that by long pressing the selected video material and dragging the same within the split region corresponding to the video material, the video image of the video material may be moved to a position of the corresponding split region, APP 1 may prompt the user by means such as vibration, text, etc., when the video material is dragged to a boundary position of the split region. For example, in user interface 14 shown in FIG. 4D, the user selects video material 2 by clicking on the split region of video material 2 and dragging video material 2 in a direction indicated by an arrow, the video image of video material 2 is moved downwards in the corresponding split region, wherein an image region portion of video material 2 that is moved outside the split region may not be displayed in region 104.

II. Adjusting a Size of the Video Material in the Corresponding Split Region

Assuming that the user may adjust the size of the video material in the split region by long pressing the selected video material simultaneously with both fingers and zooming within the region corresponding to the video material with both fingers, APP 1 may prompt the user by means such as vibration, text, etc., when the boundary of the video material aligns with the corresponding split region size. For example, in user interface 15 shown in FIG. 4E, the user selects video material 2 by clicking on the split region corresponding to video material 2, and zoom out the size of the video image of video material 2 in the corresponding split region through a double-finger operation (implementation for zooming in a video material is similar).

III. Exchanging Split Regions of Different Video Materials

Long pressing the selected video material and dragging the video material to a position of a split region of other video material, and then releasing triggers exchanging split regions, and exhibiting a video split-screen splice effect after exchanging split regions in region 104; and the video materials after exchanging split regions adapt to sizes of corresponding split regions. When a certain video material is selected, an edge box of an image region corresponding to the video material may be highlighted; when the selected video material is dragged to another split region position, an edge box of a video image region corresponding to the video material dragged by a finger always remains highlighted; releasing the finger triggers the video materials exchanging split regions or the video material returns to an original split region; and the edge box highlight of the video image region of the corresponding video material disappears.

It should be noted that other display styles may also be adopted to highlight the video material selected by the user to have the split region adjusted, which are not limited to the mode of highlighting the edge box of the image region; for example, highlighting may also be implemented by adding a mask having a specific effect to the selected video material.

Figure 4G:
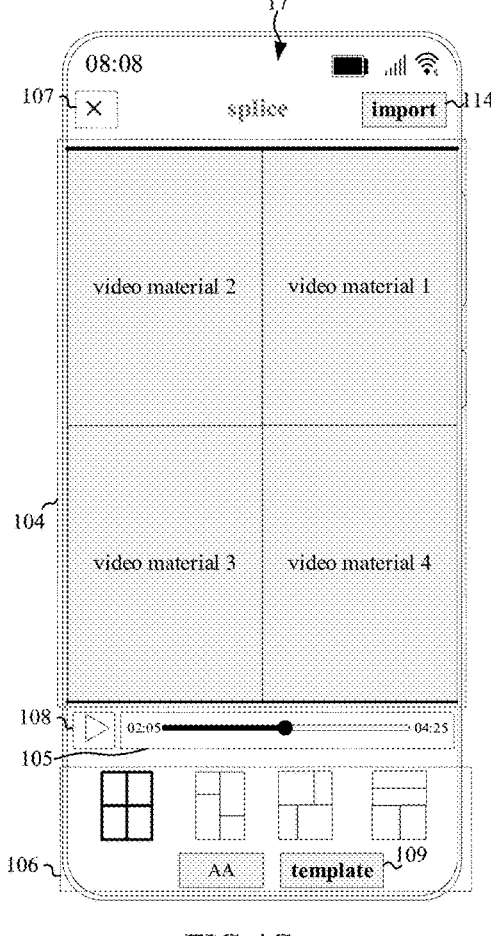

For example, with respect to user interface 16 shown in FIG. 4F and user interface 17 shown in FIG. 4G, as shown in user interface 16, the user selects video material 2 by long pressing on a split region corresponding to video material 2; and dragging video material 2 to a position of the split region corresponding to video material 1 triggers exchanging split regions between video material 1 and video material 2; a state shown in user interface 16 is a state of triggering exchanging split regions but not releasing the finger, video material 1 is moved to a position of the split region of video material 2, but video material 2 has not yet been displayed in the split region of video material 1. After the user releases his/her finger, as shown in user interface 17, video material 1 and video material 2 successfully exchange split regions; after successfully exchanging split regions, the 2 video materials each adaptively adjust a size thereof to adapt a size of the split region.

With further reference to FIG. 4B, the user may trigger displaying the function panel, by single clicking on the split region of the video material; the function panel may be used to execute some edit operations for the video material, for example, material, vertical flip, horizontal flip, and rotation, etc.

Figure 4H:
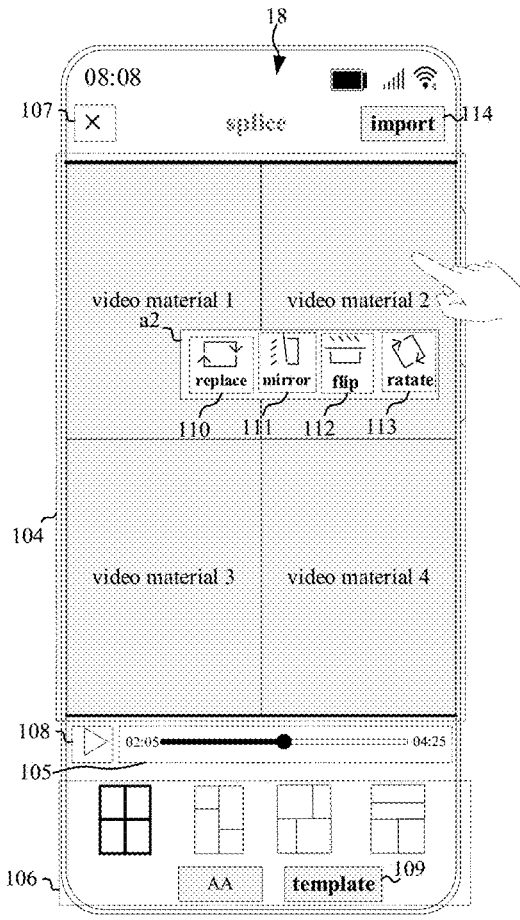

Assuming that APP 1 receives a trigger operation (e.g., a single click operation) for the split region corresponding to video material 2 in region 104, APP 1 may exemplarily display user interface 18 as shown in FIG. 4H; user interface 18 includes function panel a2 corresponding to video material 2; and function panel a2 may include: control 110 to control 113.

Control 110 is used to trigger replacing a video material; after the user operates (e.g., clicks) control 110, APP 1 may enter the material selection page, so that the user selects another clip of material (a video material or a video material generated based on an image/a photo) to replace video material 2 on the material selection page; wherein the present disclosure may allow for repeated import of the video material.

Control 111 is used to trigger vertical flip of the video image of the video material in the corresponding split region; APP 1 receives a trigger operation (e.g., a click operation) of the user for control 111, and APP 1 flips the video image of video material 2 vertically in the split region corresponding to video material 2, and displays in a left-right mirror symmetrical manner.

Control 112 is used to trigger horizontal flip of the video image of the video material in the corresponding split region; APP 1 receives a trigger operation (e.g., a click operation) of the user for control 112, and APP 1 flips the video image of video material 2 horizontally in the split region corresponding to video material 2, and displays in a horizontal mirror symmetrical manner.

Control 113 is used to trigger rotation of the video image of the video material in the split region; a rotation angle may be a preset angle, for example, every time control 113 is triggered, the selected video material may be rotated 90 degrees to the left or 90 degrees to the right.

It should be understood that the function panel may further include other controls that trigger adjustments, but are not limited to control 110 to control 113 shown in the example here.

With further reference to user interface 12 shown in FIG. 4B, it further comprises: import control 114. APP 1 receives a trigger operation for import control 114; APP 1 imports a plurality of video materials and information of the currently adopted video split-screen template into a clip draft file for recording, and jumps to the clip page; and the video editing image formed from the video images of the plurality of video materials according to the currently adopted video split-screen template is displayed in the preview region of the clip page.

In the clip draft file, material track information is assigned to the plurality of video materials; a 1st video material selected by the user is video material 1, that is, video material 1 is a video material on a main track (which may also be understood as a main track material), the remaining video materials are video materials on the picture-in-picture tracks, that is, video materials 2 to 3 are video materials on picture-in-picture tracks (which may also be understood as picture-in-picture materials); and the plurality of picture-in-picture tracks are arranged in an order of acquiring corresponding video materials.

Figure 4I:
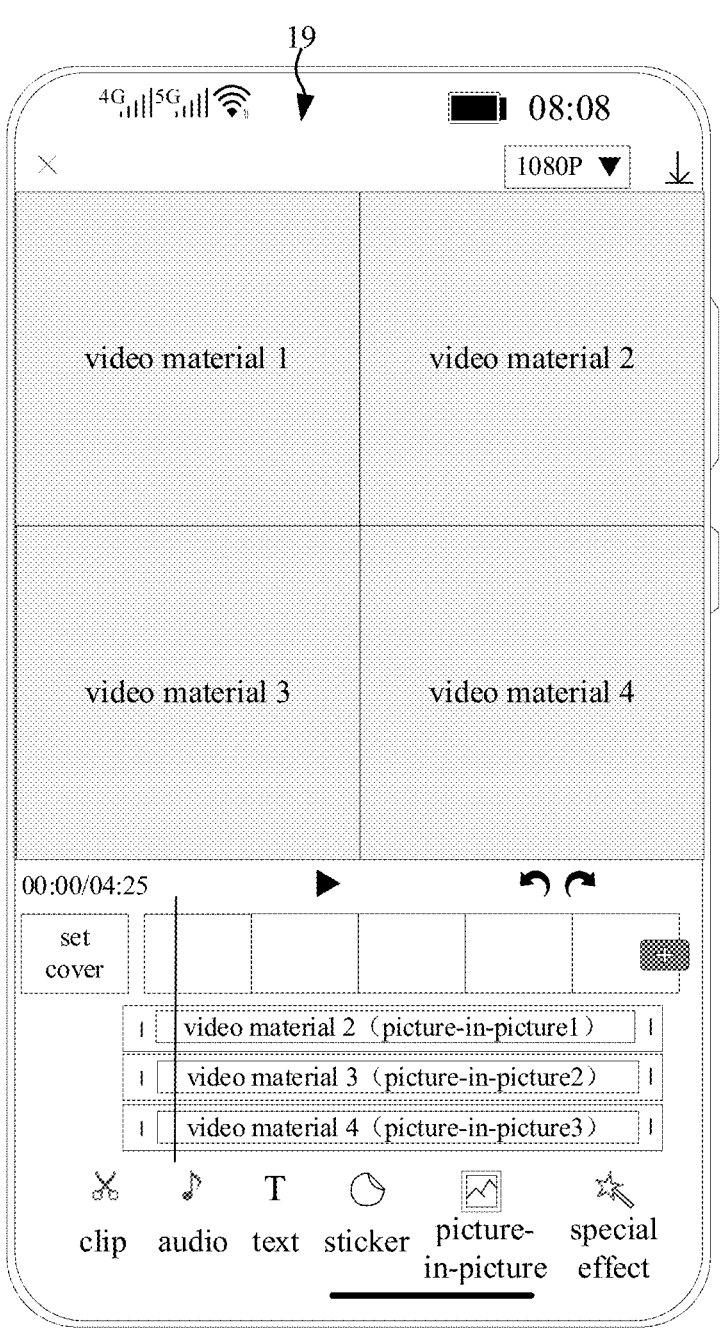

Assuming that the user does not switch the video split-screen template during the video editing process, APP 1 receives a trigger operation for import control 114 and exemplarily displays user interface 19 as shown in FIG. 4I on the mobile phone, the video editing image formed from the video images of video materials 1 to 4 according to the video split-screen template is displayed in the preview region 115 comprised in user interface 19. Afterwards, APP 1 may respond to a clip operation of the user on the clip page in the same way as the main track material and the picture-in-picture track material; for example, a certain picture-in-picture material may be deleted, and a split region corresponding to the picture-in-picture material displays a preset background; for another example, with respect to adding new picture-in-picture, if a new picture-in-picture material is added to an existing picture-in-picture track, then the picture-in-picture material will be filled into a split region of the existing picture-in-picture track, but cover a different timeline interval on the video editing track; if a new picture-in-picture track is added, the new picture-in-picture material will cover the specified split region for display.

After video split-screen splice is completed and it enters the clip page, the user may still manually adjust a picture size based on needs by reusing the picture-in-picture processing logic supported by APP 1, without separately setting the processing logic of video split-screen splice on the video clip page, which may reduce processing logic complexity of APP 1 while meeting video split-screen splice editing needs of the user.

It should be noted that the user may also preview the video split-screen splice effect on the split-screen splice page, and make adjustment to the video materials and then enter the clip project by operating import control 114, that is, the user may enter the clip page through the import control displayed in a user interface according to any embodiment shown in FIG. 4C to FIG. 4I.

Figure 5:
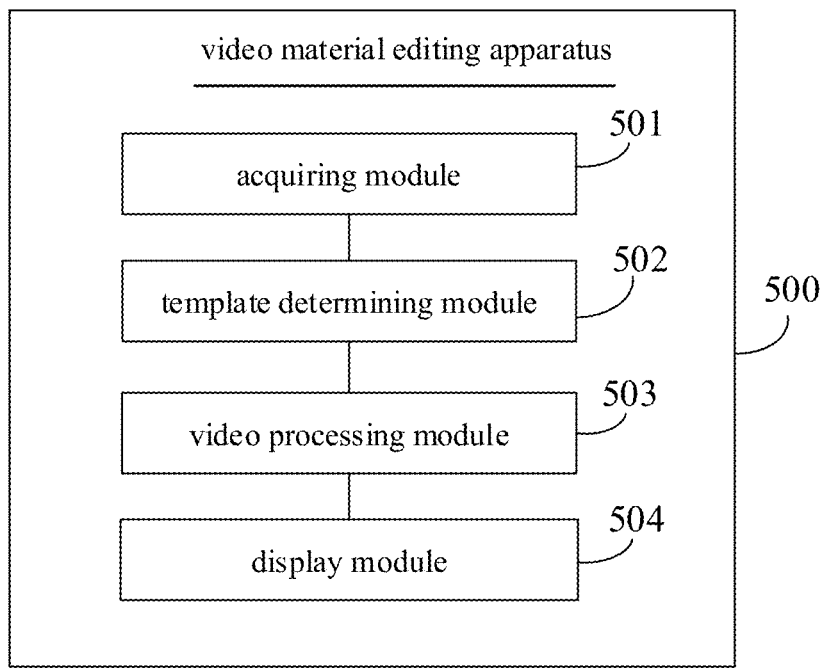
FIG. 5 is a structural schematic diagram of a video material editing apparatus provided by an embodiment of the present disclosure.

FIG. 5 is a structural schematic diagram of a video material editing apparatus provided by an embodiment of the present disclosure. Referring to FIG. 5, the apparatus 500 provided by this embodiment comprises:

an acquiring module 501, configured to acquire a plurality of video materials;

a template determining module 502, configured to determine a video split-screen template, the video split-screen template being used to indicate a plurality of split regions located in a same video image;

a video processing module 503, configured to exhibit a plurality of video track clips on a video editing track, and forming a video editing image from video images of the plurality of video track clips according to the video split-screen template; and a display module 504, configured to display the video editing image;

the plurality of video track clips are formed based on the plurality of video materials; and at least one video material among the plurality of video materials is used to form a video track clip among the plurality of video track clips; the video materials used to form different video track clips among the plurality of video track clips are different video materials in the plurality of video materials;

timeline intervals corresponding to the plurality of video track clips on the video editing track at least partially overlap with each other;

the video editing image has the plurality of split regions indicated by the video split-screen template; a split region in the video editing image is used to exhibit a video image of a video track clip among the plurality of video track clips, and different split regions in the video editing image are used to exhibit images of different video track clips among the plurality of video track clips In some embodiments, the video processing module 503 is further configured to enter a video clip page, based on the video split-screen template adopted for the plurality of video track clips, and display the video editing image formed from the video images of the plurality of video track clips according to the video split-screen template on the video clip page.

In some embodiments, the video processing module 503 is further configured to after enter the video clip page, in a corresponding clip draft file, set one of the video track clips as a video track clip on a main track, while set all other the video track clips as video track clips on picture-in-picture tracks.

In some embodiments, the video processing module 503 is specifically configured to base on an order of acquiring the plurality of video materials, set a video track clip formed from a first acquired video material as the video track clip on the main track, and set video track clips respectively formed from other video materials as video track clips on the picture-in-picture tracks, when the plurality of video track clips are in one-to-one correspondence with the plurality of video materials.

In some embodiments, the video processing module 503 is specifically configured to acquire a size of a canvas corresponding to a video editing operation; determine sizes and positions of the video images of the plurality of video track clips respectively in the canvas, based on a video editing track information of the plurality of video track clips that is acquired, a mapping relationship between the plurality of split regions indicated by the video split-screen template and the video editing tracks, and the size of the canvas; fill the video images of the plurality of video track clips in the canvas, based on the sizes and the positions of the video images of the plurality of video track clips respectively in the canvas.

The display module 504 is specifically configured to display the canvas to exhibit the video editing images formed from the video images of the plurality of video track clips according to the video split-screen template.

In some embodiments, time lengths of the plurality of video track clips formed based on the plurality of video materials are consistent with a length of the timeline, and start time points of the plurality of video track clips are aligned on the timeline.

In some embodiments, when forming a video track clip among the plurality of video track clips based on at least one video material of the plurality of video materials, the video processing module 503 is specifically configured to process the at least one video material by adopting one or more video processing methods of video speed varying, inserting or splicing a video clip with specified content, to acquire a video track clip whose time length is consistent with a length of the timeline.

In some embodiments, the video processing module 503 is further configured to respond to the video split-screen template switching instruction, and video editing images formed based on the video images of the plurality of video track clips according to the video split-screen template indicated by the video split-screen template switch instruction; the video split-screen template indicated by the video split-screen template switch instruction and the video split-screen template adopted before switch being different in layout of the plurality of split regions indicated thereby.

The display module 504 is further configured to display video editing images formed from the video images of the plurality of video track clips according to the video split-screen template indicated by the video split-screen template switch instruction.

In some embodiments, the display module 504 is further configured to respond to a preview playing instruction, and display video editing images formed from the video images of the plurality of video track clips according to the video split-screen template based on the timeline; wherein, during the playing process, when a preview playing position is located within the timeline interval covered by the video track clip on the timeline, the video image of the video track clip is displayed through the corresponding split region in the video editing image; if the preview playing position is located outside the timeline interval covered by the video track clip on the timeline, a preset background is displayed in the split region corresponding to the video track clip in the video editing image.

In some embodiments, the video processing module 503 is further configured to respond to an adjustment instruction for the video track clip, adjust a position, a direction or a size of the video image of the video track clip in the corresponding split region; or, exchange split regions corresponding to video images of different the video track clips; or, replace the video track clip in the split region; or, display the video image of the video track clip in a mirrored manner in the corresponding split region.

The apparatus provided by this embodiment may be used to execute the technical solution according to any one of the foregoing method embodiments, with similar implementation principles and technical effects, for which the detailed description of the foregoing method embodiments may be referred to; and for brevity, no details will be repeated here.

Exemplarily, the present disclosure provides an electronic device, comprising: one or more processors; a memory; and one or more computer programs; the one or more computer programs are stored in the memory; and the one or more processors, when executing the one or more computer programs, cause the electronic device to implement the video material editing method according to the foregoing embodiment.

Exemplarily, the present disclosure provides a chip system; applied to an electronic device comprising a memory and a sensor; the chip system comprises a processor; and the processor executes the video material editing method according to the foregoing embodiment.

Exemplarily, the present disclosure provides a computer readable storage medium, having a computer program stored therein; the computer program, when executed by the processor, causes the electronic device to implement the video material editing method according to the foregoing embodiment.

Exemplarily, the present disclosure provides a computer program product, wherein the computer program product, when running on a computer, causes the computer to execute the video material editing method according to the foregoing embodiment.

The above-described embodiments may be implemented in whole or in part by software, hardware, firmware, or any combination thereof. When implemented by software, it may be implemented in a form of a computer program product in whole or in part. The computer program product includes one or more computer programs or instructions. When the computer loads and executes the computer programs or instructions, the flows or functions described in the embodiments of the present disclosure are executed in whole or in part. The computer may be a general-purpose computer, a special-purpose computer, a computer network, or other programmable apparatus. The computer programs or instructions may be stored in a computer readable storage medium. The computer readable storage medium may be any available medium that can be accessed by a computer or a data storage device including a server, a data center, etc., integrated by one or more available media. The available medium may be a magnetic medium (e.g., a floppy disk, a hard disk, a magnetic tape); an optical medium (e.g., a Digital Video Disc (DVD)); or a semiconductor medium (e.g., a Solid State Disk (SSD)).

It should be noted that, relational terms herein such as "first" and "second" are only used to distinguish one entity or operation from another entity or operation, and do not necessarily require or imply any actual relationship or order between these entities or operations. In addition, the terms "include", "comprise", or any other variants thereof are intended to cover a non-exclusive inclusion, so that a process, a method, a product or a device that includes a list of elements not only includes those elements but also includes other elements that are not expressly listed, or further includes elements inherent to such process, method, product or device. Without more constraints, the elements limited by the statement "including one . . . " does not exclude that there is another same or identical element in the process, method, product, or device that includes the element.

The above is only the specific implementation provided to enable those skilled in the art to understand and practice the present disclosure. Various modifications to these embodiments will be readily apparent to those skilled in the art, and the generic principles defined herein may be applied to other embodiments without departing from the spirit or scope of the present disclosure. Therefore, the present disclosure will not be limited to these embodiments described herein, but is to be accorded the widest scope consistent with the principles and novel features disclosed herein.

What is claimed is:

1. A video material editing method, comprising:
acquiring video materials, a number of the acquired video materials being a particular number;
displaying a user interface in response to receiving user input on a control element, wherein the user interface is configured to preview and implement a video split-screen splice effect on the acquired video materials;
determining a set of split-screen templates based on the particular number, wherein each of the set of split-screen templates comprises split regions a number of which is equal to the particular number;
generating a first video editing image based on the acquired video materials and a default split-screen template, wherein the default split-screen template is among the set of the split-screen templates;
displaying the first video editing image in a first area of the user interface;
displaying at least a subset of the split-screen templates in a second area of the user interface, wherein each of the displayed split-screen templates is selectable, and each of the displayed split-screen templates is configured to visually exhibit the particular number of split regions in a different layout;
exhibiting the acquired video materials on a plurality of video editing tracks, respectively, wherein the plurality of video editing tracks are arranged in an order of the acquiring the video materials;
receiving a selection of one of the displayed split-screen templates, wherein the selected split-screen template is different from the default split-screen template;
generating a second video editing image based on the acquired video materials and the selected split-screen template; and
switching to displaying the second video editing image from the first video image in the first area of the user interface, wherein each of the first video editing image and the second video editing image has the particular number of split regions, wherein a split region in each video editing image is configured to exhibit one of the acquired video materials, and wherein different split regions in each video editing image are configured to exhibit different video materials among the acquired video materials.

2. The method according to claim 1, further comprising:
entering a video clip page, based on one of the set of video split-screen templates adopted for the acquired video materials, and displaying the video editing image formed from video images of the acquired video materials according to the one of the set of video split-screen templates on the video clip page.

3. The method according to claim 2, wherein after entering the video clip page, in a corresponding clip draft file, setting one of the acquired video materials as a video material on a main track, while setting all other the acquired video materials as video materials on picture-in-picture tracks.

4. The method according to claim 3, wherein the setting one of the acquired video materials as the video track clip on the main track, while setting all other the acquired video materials as the video materials on the picture-in-picture tracks, comprises:

based on an order of acquiring the video materials, setting a first acquired video material on the main track, and setting video materials respectively formed from other acquired video materials as video materials on the picture-in-picture tracks.

5. The method according to claim 1, wherein the method further comprises:

acquiring a size of a canvas corresponding to a video editing operation;

determining sizes and positions of the video images of the acquired video materials respectively in the canvas, based on a video editing track information of the acquired video materials, a mapping relationship between the split regions indicated by the video split-screen template and the video editing tracks, and the size of the canvas;

filling the video images of the acquired video materials in the canvas, based on the sizes and the positions of the video images of the acquired video materials respectively in the canvas, and displaying the canvas to exhibit the video editing images formed from the video images of the acquired video materials according to the video split-screen template.

6. The method according to claim 1, wherein at least one video material is processed by adopting one or more of video processing modes of video speed varying, inserting or splicing a video clip with specified content, to acquire a video track clip whose time length is consistent with a length of a timeline.

7. The method according to claim 6, further comprising:

playing, in response to a preview playing instruction, video editing images formed from the video images of the acquired video materials according to the video split-screen template based on the timeline, wherein, during the playing process, when a preview playing position is located within the timeline interval covered by the video track clip on the timeline, the video image of the video track clip is displayed through the corresponding split region in the video editing image; if the preview playing position is located outside the timeline interval covered by the video track clip on the timeline, a preset background is displayed in the split region corresponding to the video track clip in the video editing image.

8. The method according to claim 6, further comprising:

in response to an adjustment instruction for the video track clip, adjusting a position, a direction or a size of the video image of the video track clip in the corresponding split region; or, exchanging split regions corresponding to video images of different the video track clips; or, replacing the video track clip in the split region; or, displaying the video image of the video track clip in a mirrored manner in the corresponding split region.

9. A non-transitory computer readable storage medium, comprising: computer program instructions, wherein the computer program instructions, upon execution by an electronic device, cause the electronic device to implement operations comprising acquiring video materials, a number of the acquired video materials being a particular number;

displaying a user interface in response to receiving user input on a control element, wherein the user interface is configured to preview and implement a video split-screen splice effect on the acquired video materials;

determining a set of split-screen templates based on the particular number, wherein each of the set of split-screen templates comprises split regions a number of which is equal to the particular number;

generating a first video editing image based on the acquired video materials and a default split-screen template, wherein the default split-screen template is among the set of the split-screen templates;

displaying the first video editing image in a first area of the user interface;

displaying at least a subset of the split-screen templates in a second area of the user interface, wherein each of the displayed split-screen templates is selectable, and each of the displayed split-screen templates is configured to visually exhibit the particular number of split regions in a different layout;

exhibiting the acquired video materials on a plurality of video editing tracks, respectively, wherein the plurality of video editing tracks are arranged in an order of the acquiring the video materials;

receiving a selection of one of the displayed split-screen templates, wherein the selected split-screen template is different from the default split-screen template;

generating a second video editing image based on the acquired video materials and the selected split-screen template; and switching to displaying the second video editing image from the first video image in the first area of the user interface, wherein each of the first video editing image and the second video editing image has the particular number of split regions, wherein a split region in each video editing image is configured to exhibit one of the acquired video materials, and wherein different split regions in each video editing image are configured to exhibit different video materials among the acquired video materials.

10. The non-transitory computer readable storage medium according to claim 9, the operations further comprising:

acquiring a size of a canvas corresponding to a video editing operation;

determining sizes and positions of video images of the acquired video materials respectively in the canvas based on a video editing track information of the acquired video materials, a mapping relationship between the split regions indicated by one of the set of video split-screen templates and the video editing tracks, and the size of the canvas;

filling the video images of the acquired video materials in the canvas, based on the sizes and the positions of the video images of the acquired video materials respectively in the canvas; and displaying the canvas to exhibit the video editing images formed from the video images of the acquired video materials according to one of the set of video split-screen templates.

11. The non-transitory computer readable storage medium according to claim 9, wherein at least one video material is processed by adopting one or more of video processing modes of video speed varying, inserting or splicing a video clip with specified content, to acquire a video track clip whose time length is consistent with a length of a timeline.

12. An electronic device, comprising: at least one memory and at least one processor, wherein the at least one memory is configured to store computer program instructions; the at least one processor is configured to execute the computer program instructions, and the computer program instructions, upon execution by the at least one processor, cause the at least one processor to implements operations comprising:

acquiring video materials, a number of the acquired video materials being a particular number;

displaying a user interface in response to receiving user input on a control element, wherein the user interface is configured to preview and implement a video split-screen splice effect on the acquired video materials;

determining a set of split-screen templates based on the particular number, wherein each of the set of split-screen templates comprises split regions a number of which is equal to the particular number;

generating a first video editing image based on the acquired video materials and a default split-screen template, wherein the default split-screen template is among the set of the split-screen templates;

displaying the first video editing image in a first area of the user interface;

displaying at least a subset of the split-screen templates in a second area of the user interface, wherein each of the displayed split-screen templates is selectable, and each of the displayed split-screen templates is configured to visually exhibit the particular number of split regions in a different layout;

exhibiting the acquired video materials on a plurality of video editing tracks, respectively, wherein the plurality of video editing tracks are arranged in an order of the acquiring the video materials;

receiving a selection of one of the displayed split-screen templates, wherein the selected split-screen template is different from the default split-screen template;

generating a second video editing image based on the acquired video materials and the selected split-screen template; and switching to displaying the second video editing image from the first video image in the first area of the user interface, wherein each of the first video editing image and the second video editing image has the particular number of split regions, wherein a split region in each video editing image is configured to exhibit one of the acquired video materials, and wherein different split regions in each video editing image are configured to exhibit different video materials among the acquired video materials.

13. The electronic device according to claim 12, the operations further comprising:

acquiring a size of a canvas corresponding to a video editing operation;

determining sizes and positions of video images of the acquired video materials respectively in the canvas based on a video editing track information of the acquired video materials, a mapping relationship between the split regions indicated by one of the set of video split-screen templates and the video editing tracks, and the size of the canvas;

filling the video images of the acquired video materials in the canvas, based on the sizes and the positions of the video images of the acquired video materials respectively in the canvas; and displaying the canvas to exhibit the video editing images formed from the video images of the acquired video materials according to one of the set of video split-screen templates.

14. The electronic device according to claim 12, wherein at least one video material is processed by adopting one or more of video processing modes of video speed varying, inserting or splicing a video clip with specified content, to acquire a video track clip whose time length is consistent with a length of a timeline.

* * * * *